(12) United States Patent
Naoi et al.

(10) Patent No.: US 8,247,100 B2
(45) Date of Patent: *Aug. 21, 2012

(54) ELECTROCHEMICAL DEVICE

(75) Inventors: Katsuo Naoi, Tokyo (JP); Kenji Nishizawa, Tokyo (JP); Mitsuo Kougo, Tokyo (JP)

(73) Assignee: TDK Corporation, Tokyo (JP)

( * ) Notice: Subject to any disclaimer, the term of this patent is extended or adjusted under 35 U.S.C. 154(b) by 714 days.

This patent is subject to a terminal disclaimer.

(21) Appl. No.: 12/408,137

(22) Filed: Mar. 20, 2009

(65) Prior Publication Data
US 2009/0246612 A1    Oct. 1, 2009

(30) Foreign Application Priority Data

Mar. 26, 2008  (JP) ................ P2008-081212

(51) Int. Cl.
*H01M 2/14* (2006.01)
*H01M 10/42* (2006.01)
(52) U.S. Cl. ........................ 429/61; 429/246
(58) Field of Classification Search .............. 429/61, 429/246
See application file for complete search history.

(56) References Cited

U.S. PATENT DOCUMENTS

| 6,054,233 A * | 4/2000 | Vourlis ............................ 429/61 |
| 2005/0219802 A1* | 10/2005 | Kobayashi et al. ............ 361/523 |
| 2009/0246638 A1* | 10/2009 | Naoi et al. ..................... 429/246 |

FOREIGN PATENT DOCUMENTS

| JP | A-11-312506 | 11/1999 |
| JP | A-2000-100399 | 4/2000 |
| JP | A-2007-257848 | 10/2007 |
| JP | A-2008-21443 | 1/2008 |

OTHER PUBLICATIONS

Office Action dated Nov. 25, 2010 in Chinese Patent Application No. 200910129458.6.

* cited by examiner

*Primary Examiner* — Stephen J. Kalafut
(74) *Attorney, Agent, or Firm* — Oliff & Berridge, PLC (57) ABSTRACT

An electrochemical device having an electrode matrix including a multilayer structure laminating positive and negative electrodes with a separator interposed therebetween; wherein at least one of the positive and negative electrodes has a resistance control layer at least at an edge part exposed when the separator thermally shrinks on a surface on the separator side; and wherein the resistance control layer has a resistance value as a total resistance value of the electrode matrix falling in such a range that an estimated internal short circuit current between the positive and negative electrodes is equivalent to 0.09 C to 1 C.

8 Claims, 6 Drawing Sheets

ELECTROCHEMICAL DEVICE

BACKGROUND OF THE INVENTION

1. Field of the Invention

The present invention relates to an electrochemical device.

2. Related Background Art

As portable electronic devices have been becoming widespread, there have been increasing demands for lightweight, small-size electrochemical devices which can continuously be driven for a long time, such as secondary batteries. While conventional secondary batteries used metal outer cans, it has become possible to reduce the battery weight by employing thin, lightweight films for outer bags, as typified by lithium polymer batteries, thereby increasing the degree of freedom in designing.

When some abnormalities happen in a battery using such a film as its outer bag, gases may be generated or, in the worst case, ignition may occur depending on kinds of electrolytes in use. While chargers are set such as to stop charging when reaching a predetermined time or voltage, electrochemical devices will be overcharged if the charging does not stop before exceeding their capacity by some reason. As the overcharged state further progresses, electrolytes may decompose, so as to yield gases, which may inflate outer bags and cause internal short circuits due to internal deformations, thereby exploding the bags or igniting the electrochemical devices, It has also been known that secondary batteries using lithium ions are likely to cause thermal runaway when a certain temperature is exceeded. Thermal runaway generates gases and further heat, thereby exploding or igniting the batteries.

For evading such circumstances, mechanisms provided with safety valves so as to release gases when the internal pressure rises have been under study, for example, as described in Japanese Patent Application Laid-Open Nos. 2000-100399 and HEI 11-312506.

SUMMARY OF THE INVENTION

However, safety valves such as those mentioned above do not always act stably. Also, if outer packages are inflated by internal pressures so that pressures apply to electrode matrixes before the safety valves act, the electrode matrixes may deform, thereby generating internal short circuits, so that the inner heat may cause thermal runaway in positive electrodes, which may lead to explosion or ignition in the worst case.

In view of the problems of the prior art mentioned above, it is an object of the present invention to provide an electrochemical device which prevents it from exploding and igniting because of temperature rises within its outer package, thereby dramatically improving its safety.

For achieving the above-mentioned object, the present invention provides an electrochemical device having an electrode matrix including a multilayer structure laminating positive and negative electrodes with a separator interposed therebetween; wherein at least one of the positive and negative electrodes has a resistance control layer at least at an edge part exposed when the separator thermally shrinks on a surface on the separator side; and wherein the resistance control layer has a resistance value as a total resistance value of the electrode matrix falling in such a range that an estimated internal short circuit current between the positive and negative electrodes is equivalent to 0.09 C to 1 C.

In the present invention, "estimated internal short circuit current" refers to a current which is tolerable in terms of safety when the positive and negative electrodes in the present invention are short-circuited through the resistance control layer at an abnormally high temperature. In other words, it means a safe current range when an internal short circuit occurs between the positive and negative electrodes through the resistance control layer. The value of the estimated internal short circuit current can be calculated by Ohm's law (V=IR) according to the capacity of the cell and the fully charged battery voltage. Supposing that the cell capacity and the fully charged battery voltage are 2 [Ah] and 4.2 [V], respectively, for example, the resistance value needed for making the estimated internal short circuit current equivalent to 1 C is 4.2 [V]/(2×1) [A]=2.1 [Ω]. The resistance value needed for making the estimated internal short circuit current equivalent to 0.1 C in the same cell is 4.2 [V]/(2×0.1) [A]=21 [Ω]. Here, "equivalent to 1 C" refers to a current corresponding to an amount charged/discharged for 1 hr with a current corresponding to the cell capacity.

As a result of diligent studies, the inventors have found that the safety of an electrochemical device can be secured when the total resistance value in the thickness direction of the resistance control layer of the positive and negative electrodes is set to such a range that the estimated internal short circuit current is equivalent to 0.09 C to 1 C. That is, when placed in a dangerous temperature atmosphere by a temperature rise within the outer package, the electrochemical device in accordance with the present invention can generate moderate self-discharge, so as to shift active materials used in the electrochemical device to more thermostable regions, whereby the safety of the electrochemical device can be improved dramatically. Such effects are obtained because, when the electrochemical device is placed in a dangerous temperature atmosphere by a temperature rise within the outer package, the separator thermally shrinks, so that the positive and negative electrodes in the electrode matrix come into electrical contact with each other through the resistance control layer, thereby causing a moderate internal short circuit. At least one pair of positive and negative electrodes thus moderately short-circuit each other through the resistance control layer, thereby making it possible to safely lower the battery capacity, evade thermal runaway due to the Joule heat at the time of hard short-circuiting, and prevent the outer package from exploding and the electrochemical device from igniting, thereby dramatically improving the safety of the electrochemical device in abnormally high temperature atmospheres.

Preferably, in the electrochemical device in accordance with the present invention, each or one of the positive and negative electrodes has the resistance control layer, while the total resistance value of the electrode matrix is adjusted so as to fall within the above-mentioned range.

In other words, while both or any of the positive and negative electrodes arranged so as to oppose each other through the separator may be provided with the resistance control layer, it will be preferred if their total resistance value in the thickness direction is adjusted to such a range that the estimated internal short circuit current is equivalent to 0.09 C to 1 C. When a short circuit occurs between the positive and negative electrodes, an extremely safe and moderate internal short circuit can be generated because the resistance control layer having the above-mentioned resistance value is interposed therebetween, whereby the safety of the electrochemical device in abnormally high temperature atmospheres can dramatically be improved.

Preferably, in the electrochemical device in accordance with the present invention, the resistance control layer is a layer containing carbon black, a binder, and a ceramic particle. This makes it easier to adjust the resistance value of the resistance control layer in the thickness direction, so that a thin resistance control layer having a favorable resistance value can be formed, whereby the safety of the electrochemical device in abnormally high temperature atmospheres can farther be improved.

Preferably, the ratio of the content of the carbon black to that of the binder and ceramic particle in the resistance control layer is 1:99 to 10:90 in terms of mass ratio. When the contents of these components fall within the range mentioned above, a thin resistance control layer having a favorable resistance value can easily be formed, whereby the safety of the electrochemical device in abnormally high temperature atmospheres can further be improved.

It will also be preferred in the electrochemical device in accordance with the present invention if the resistance control layer is a layer made of a high-resistance metal material or a ceramic material. This also makes it easier to adjust the resistance value of the resistance control layer in the thickness direction, so that a thin resistance control layer having a favorable resistance value can be formed, whereby the safety of the electrochemical device in abnormally high temperature atmospheres can further be improved.

Preferably, in the electrochemical device in accordance with the present invention, the separator is constituted by a polyolefin, a polyamide imide having a surface coated with a polyacrylonitrile, a drawn polyolefin, a nonwoven-type polyolefin, a nonwoven-type polyacrylonitrile, a nonwoven-type polyamide imide, or a mixture or combination thereof. When the electrochemical device is placed in a dangerous temperature atmosphere, such a separator is likely to shrink, thus making it easier for the positive and negative electrodes to moderately short-circuit each other through the resistance control layer in abnormally high temperature atmospheres, whereby the safety of the electrochemical device can further be improved.

Preferably, in the electrochemical device in accordance with the present invention, at least one of the positive and negative electrodes is accommodated within the separator shaped like a bag having an opening. In this case, when the separator thermally shrinks, the electrode accommodated therewithin is exposed out of the opening of the bag-shaped separator. Thus, the shrinking direction of the separator and the exposed part of the electrode can be controlled, whereby the short circuit between the positive and negative electrodes through the resistance control layer can be generated more reliably by forming the resistance control layer at an edge part on the opening side of at least one of the positive and negative electrodes. It can also prevent unexpected short circuits from occurring anywhere other than the vicinity of the opening, whereby the safety can be enhanced more.

As in the foregoing, the present invention can provide an electrochemical device which prevents it from exploding and igniting because of temperature rises within its outer package, thereby dramatically improving its safety.

DESCRIPTION OF THE PREFERRED EMBODIMENTS

In the following, preferred embodiments of the present invention will be explained in detail with reference to the drawings. In the drawings, identical or equivalent parts will be referred to with the same signs while omitting their overlapping explanations. Positional relationships such as upper/lower and left/right are based on those illustrated in the drawings unless otherwise specified. Ratios of dimensions in the drawings are not limited to those depicted.

Figure 1:
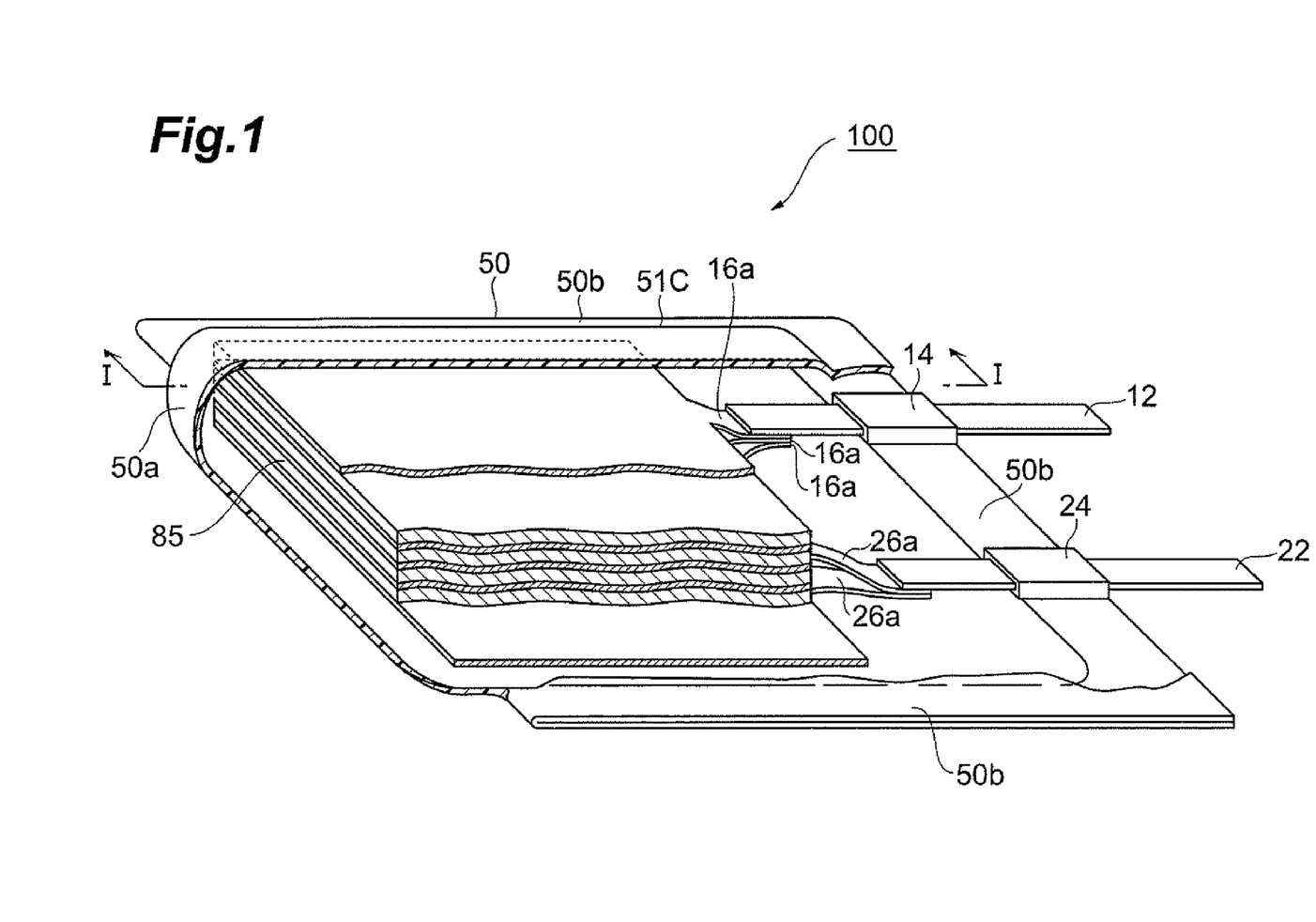
FIG. 1 is a partly broken perspective view illustrating a preferred embodiment of a lithium-ion secondary battery as the electrochemical device in accordance with the present invention.
Figure 2:
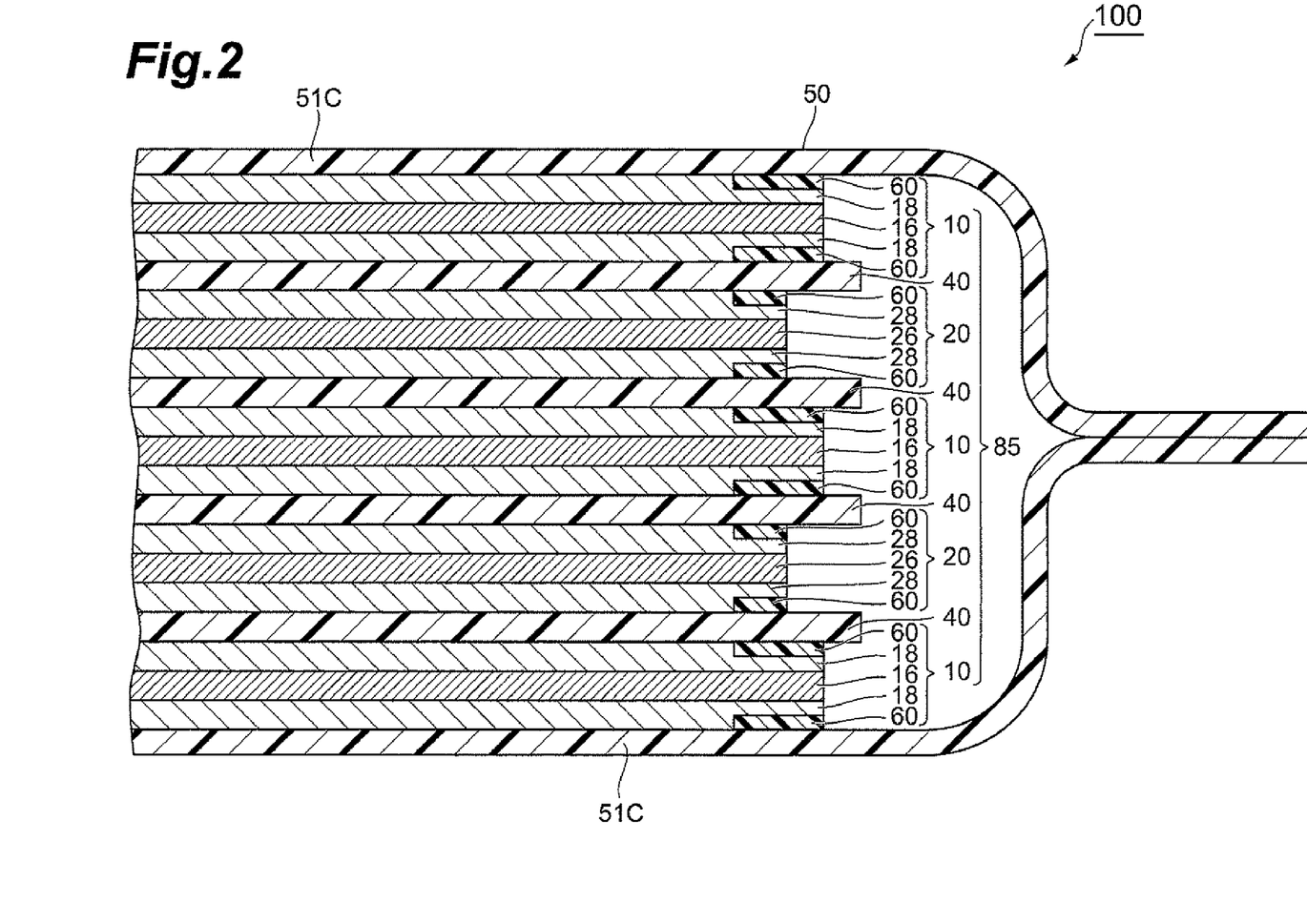
FIG. 2 is a schematic sectional view taken along the line I-I of FIG. 1.

FIG. 1 is a partly broken perspective view illustrating a preferred embodiment of a lithium-ion secondary battery as the electrochemical device in accordance with the present invention. FIG. 2 is a partial sectional view taken along the line I-I of FIG. 1.

As illustrated in FIGS. 1 and 2, the lithium-ion secondary battery 100 in accordance with this embodiment is mainly constituted by an electrode matrix 85, a case (outer package) 50 accommodating the electrode matrix 85 in a closed state, and leads 12, 22 for connecting the electrode matrix 85 to the outside of the case 50.

The electrode matrix 85 includes a multilayer structure laminating negative electrodes 10 and positive electrodes 20 with separators 40 interposed therebetween. In this embodiment, the electrode matrix 85 is one in which the negative electrode 10, separator 40, positive electrode 20, separator 40, negative electrode 10, separator 40, positive electrode 20, separator 40, and negative electrode 10 are laminated in order from the upper side as illustrated in FIG. 2.

In this specification, the "negative electrode", which is based on the polarity of the battery at the time of discharging, refers to an electrode which releases electrons by an oxidation reaction at the time of discharging. The "positive electrode", which is based on the polarity of the battery at the time of discharging, refers to an electrode which receives electrons by a reduction reaction at the time of discharging.

The case 50 accommodates an electrolytic solution (not depicted) together with the electrode matrix 85 impregnated therewith.

Constituents of the lithium-ion secondary battery 100 in accordance with this embodiment will now be explained.

Each negative electrode 10 is constituted by a negative electrode current collector 16, negative electrode active material containing layers 18 formed on both faces of the negative electrode current collector 16, and resistance control layers 60 formed at respective edge parts of the surfaces of the negative electrode active material containing layers 18. Each edge part formed with the resistance control layer 60 includes at least a part exposed when the separator thermally shrinks.

The negative electrode current collector 16 is not limited in particular as long as it is a good conductor which can sufficiently move electric charges to the negative electrode active material containing layers 18; current collectors employed in known lithium-ion secondary batteries can be used. Specific examples of the negative electrode current collector 16 include metal foils made of copper, nickel, and the like.

The negative electrode active material containing layer 18 is a layer containing a negative electrode active material, a conductive auxiliary agent, a binder, and the like.

The negative electrode active material is not limited in particular as long as it allows occlusion and release of lithium ions, desorption and insertion (intercalation) of lithium ions, or doping and undoping of lithium ions and their counter anions (e.g., $ClO_4^-$) to proceed reversibly; materials similar to those used in known lithium-ion secondary batteries can be used. Examples include carbon materials such as natural graphite, synthetic graphite, mesocarbon microbeads, mesocarbon fiber (MCF), cokes, grasslike carbon, and fired bodies of organic compounds; metals such as Al, Si, and Sn which are combinable with lithium; amorphous compounds mainly composed of oxides such as $SiO_2$ and $SnO_2$; and lithium titanate ($Li_4Ti_5O_{12}$).

Preferably, the negative electrode active material containing layer 18 has a thickness of 15 to 80 µm. Preferably, the amount of the negative electrode active material supported by the negative electrode active material containing layer 18 is 2 to 12 mg/cm$^2$. Here, the supported amount refers to the mass of the negative electrode active material per unit surface area of the negative electrode current collector 16.

The conductive auxiliary agent is not limited in particular as long as it can make the conductivity of the negative electrode active material containing layer 18 favorable; known conductive auxiliary agents can be used. Examples include carbon blacks; carbon materials; fine powders of metals such as copper, nickel, stainless steel, and iron; mixtures of the carbon materials and metal fine powders; and conductive oxides such as ITO.

The binder is not limited in particular as long as it can bind particles of the negative electrode active material and conductive auxiliary agent to the negative electrode current conductor 16; known binders can be used. Examples include fluororesins such as polyvinylidene fluoride (PVDF), polytetrafluoroethylene (PTFE), tetrafluoroethylene/hexafluoropropylene copolymers (FEP), tetrafluoroethylene/perfluoroalkylvinyl ether copolymers (PFA), ethylene/tetrafluoroethylene copolymers (ETFE), polychlorotrifluoroethylene (PCTFE), ethylene/chlorotrifluoroethylene copolymers (ECTFE), and polyvinyl fluoride (PVF); and styrene/butadiene rubber (SBR).

The positive electrode 20 is constituted by a positive electrode current collector 26, positive electrode active material containing layers 28 formed on both faces of the positive electrode current collector 26, and resistance control layers 60 formed at respective edge parts of the surfaces of the positive electrode active material containing layers 28. Each edge part formed with the resistance control layer 60 includes at least a part exposed when the separator thermally shrinks.

The positive electrode current collector 26 is not limited in particular as long as it is a good conductor which can sufficiently move electric charges to the positive electrode active material containing layers 28; current collectors employed in known lithium-ion secondary batteries can be used. Specific examples of the positive electrode current collector 26 include metal foils made of aluminum and the like.

The positive electrode active material containing layer 28 is a layer containing a positive electrode active material, a conductive auxiliary agent, a binder, and the like.

The positive electrode active material is not limited in particular as long as it allows occlusion and release of lithium ions, desorption and insertion (intercalation) of lithium ions, or doping and undoping of lithium ions and their counter anions (e.g., $ClO_4^-$) to proceed reversibly; known electrode active materials can be used. Examples include lithium cobaltate ($LiCoO_2$), lithium nickelate ($LiNiO_2$), lithium manganese spinel ($LiMn_2O_4$), and mixed metal oxides such as those expressed by the general formula of $LiNi_xCo_yMn_zO_2$ (x+y+z=1), a lithium vanadium compound ($LiV_2O_5$), olivine-type $LiMPO_4$ (where M is Co, Ni, Mn, or Fe), and lithium titanate ($Li_4Ti_5O_{12}$).

Preferably, the positive electrode active material containing layer 28 has a thickness of 15 to 90 µm. The amount of the positive electrode active material supported by the positive electrode active material containing layer 28 can be set arbitrarily as appropriate in response to the amount of the negative electrode active material supported by the negative electrode active material containing layer 18, but is preferably 5 to 25 mg/cm$^2$, for example.

As for the constituents other than the positive electrode active material contained in the positive electrode active material containing layer 28, materials similar to those constituting the negative electrode active material containing layer 18 can be used. Preferably, the positive electrode active material containing layer 28 also contains a conductive auxiliary agent similar to that in the negative electrode active material containing layer 18.

The resistance control layers 60 provided with the negative and positive electrodes 10, 20 are not limited in particular as long as they can generate a moderate short circuit between the negative and positive electrodes 10, 20 in contact with each other through the resistance control layers 60. The resistance value of the resistance control layers 60 is adjusted in response to the capacity, current value, and the like of the electrochemical device such that the estimated internal short circuit current is equivalent to 0.09 C to 1 C. When the sum of resistance values of the resistance control layers 60 in the whole multilayer body is such a resistance value that the estimated internal short circuit current is equivalent to less than 0.09 C, self-discharge cannot be performed sufficiently, whereby a thermally stable charged state is hard to achieve. When the resistance value is such that the estimated internal short circuit current is equivalent to more than 1.0 C, the Joule heat is generated in excess by self-discharge, whereby the temperature of the battery rises drastically. Because of the same reason, the estimated short circuit current is preferably at most 2 A as a current value. It will typically be preferred if the total resistance value of the resistance control layers 60 in the whole electrode matrix 85 falls within the range of 2 to 30 Ω. This resistance value can be adjusted according to the material, thickness, and the like of the resistance control layers 60.

Each resistance control layer 60 is preferably a layer containing a conductive material, a high-resistance material, and a binder, a layer made of a high-resistance metal material, or a layer made of a ceramic material, since a stable resistance value can be obtained with a sufficient thinness thereby.

When the resistance control layer 60 is a layer containing a conductive material, a high-resistance material, and a binder, examples of the conductive material include carbon black, graphite, carbon nanotubes, acetylene black, and ketjen black, among which carbon black is preferred. Examples of the high-resistance material include ceramic particles and resin particles, among which the ceramic particles are preferred. Examples of the ceramic particles include alumina particles, silicon dioxide, zirconium oxide, and titanium oxide. Examples of the binder include polyvinylidene fluoride (PVDF) and polytetrafluoroethylene (PTFE).

When the resistance control layer 60 is a layer containing a conductive material, a high-resistance material, and a binder, the ratio of the content of the conductive material to that of the binder and high-resistance material is preferably 1:99 to 10:90, more preferably 3:97 to 5:95, in terms of mass ratio. When the content of the conductive material is less than the above-mentioned ratio, the resistance of the resistance control layer tends to become so high that self-discharge is not performed sufficiently, whereby the discharge may fail to advance to a thermally stable charging state. When the content is greater than the above-mentioned ratio, the resistance of the resistance control layer tends to become so low that a greater amount of Joule heat is generated by self-discharge, whereby the battery temperature may rise abnormally.

When the resistance control layer 60 is a layer made of a high-resistance metal material, examples of the high-resistance metal material include tungsten, tantalum, and nickel-chromium alloys. Among them, tungsten is preferred from the viewpoint of its favorable film thickness controllability which makes it easier to adjust the resistance value.

When the resistance control layer 60 is a layer made of a ceramic material, examples of the ceramic material include amorphous silicon, silicon dioxide, aluminum oxide, and titanium oxide. Among them, amorphous silicon is preferred from the viewpoint of its flexibility to deformations from the outside.

The resistance control layers 60 in the positive electrodes 20 may be identical to or different from the resistance control layers 60 in the negative electrodes 10 in terms of the material, thickness, and the like.

Each separator 40 is formed from an electrically insulating porous body. The separator 40 has heat shrinkability. As for the material of the separator 40, known separator materials can be used without any limitations in particular. Examples of the electrically insulating porous body include laminates of films made of polyacrylonitrile, polyethylene, polypropylene, polyolefin, and the like; drawn films of mixtures of the resins mentioned above; and fibrous nonwovens made of at least one constituent material selected from the group consisting of cellulose, polyester, and polypropylene. The separator 40 is needed to have high heat shrinkability in order to exhibit a self-discharging function and a shutdown function, and high heat resistance in order to keep its form even when temperature further rises after the heat shrinkage. For fully exhibiting such functions, it will be preferred if the separator 40 is one made of a drawn polyolefin, a composite film of a polyolefin and a polyacrylonitrile, a composite film of a polyolefin and a polyamide imide, a polyamide imide having a surface coated with a polyacrylonitrile, or the like.

At an abnormally high temperature, it is necessary for the separator 40 to generate moderate self-discharge by bringing only the resistance control layers into contact with each other without generating short circuits in the other parts. For efficiently realizing these features, the separator preferably has a shrinkage ratio of about 0.5 to 10%, more preferably about 3 to 8%, at 120° C.

Here, as illustrated in FIG. 2, the electrode matrix 85 seen as a plane reduces its area in the order of the separator 40, negative electrode 10, and positive electrode 20, so that the end face of the negative electrode 10 projects out of the end face of the positive electrode 20, while the end face of the separator 40 projects out of the end face of the negative electrode 10.

This makes it easier for the electrode matrix 85 to make the whole surface of each positive electrode 20 oppose its corresponding negative electrode 10 even when the layers are somewhat shifted from each other in directions intersecting the laminating direction because of errors during their manufacture and the like. Therefore, lithium ions released from the positive electrode 20 are fully taken into the negative electrode 10 through the separator 40. When the lithium ions released from the positive electrode 20 are not fully taken into the negative electrode 10, the lithium ions not taken into the negative electrode 10 are deposited, so that carriers for electric energy decrease, whereby the energy capacity of the battery may deteriorate. Further, since the separator 40 is greater than each of the positive and negative electrodes 20, 10 and projects out of their end faces, the positive and negative electrodes 20, 10 can be restrained from coming into contact with each other and generating a short-circuit.

Preferably, in the end face of the separator 40 projecting out of the negative electrode 10, the edge part side formed with the resistance control layer 60 is made narrower than the other side. This makes it easier to preferentially generate a moderate short circuit between the positive and negative electrodes 20, 10 through the resistance control layer 60 in abnormally high temperature atmospheres.

The separator 40 is preferably formed like a bag having an opening, within which the electrodes are preferably accommodated. The opening is provided at one side facing the edge parts of the electrodes formed with the resistance control layers 60. Using such a separator 40 can regulate the shrinking direction of the separator 40, so as to control parts where the electrodes are exposed when the separator 40 shrinks, thereby reliably generating a moderate short circuit between the positive and negative electrodes 20, 10 through the resistance control layer 60 in abnormally high temperature atmospheres.

The respective resistance control layers 60 of the positive and negative electrodes 20, 10 are preferably formed in parts opposing each other through the separator 40 as illustrated in FIG. 2. This can increase an area where the positive and negative electrode active material containing layers 28, 18 oppose each other without the resistance control layer 60, thereby keeping the battery capacity from decreasing.

Figure 3:
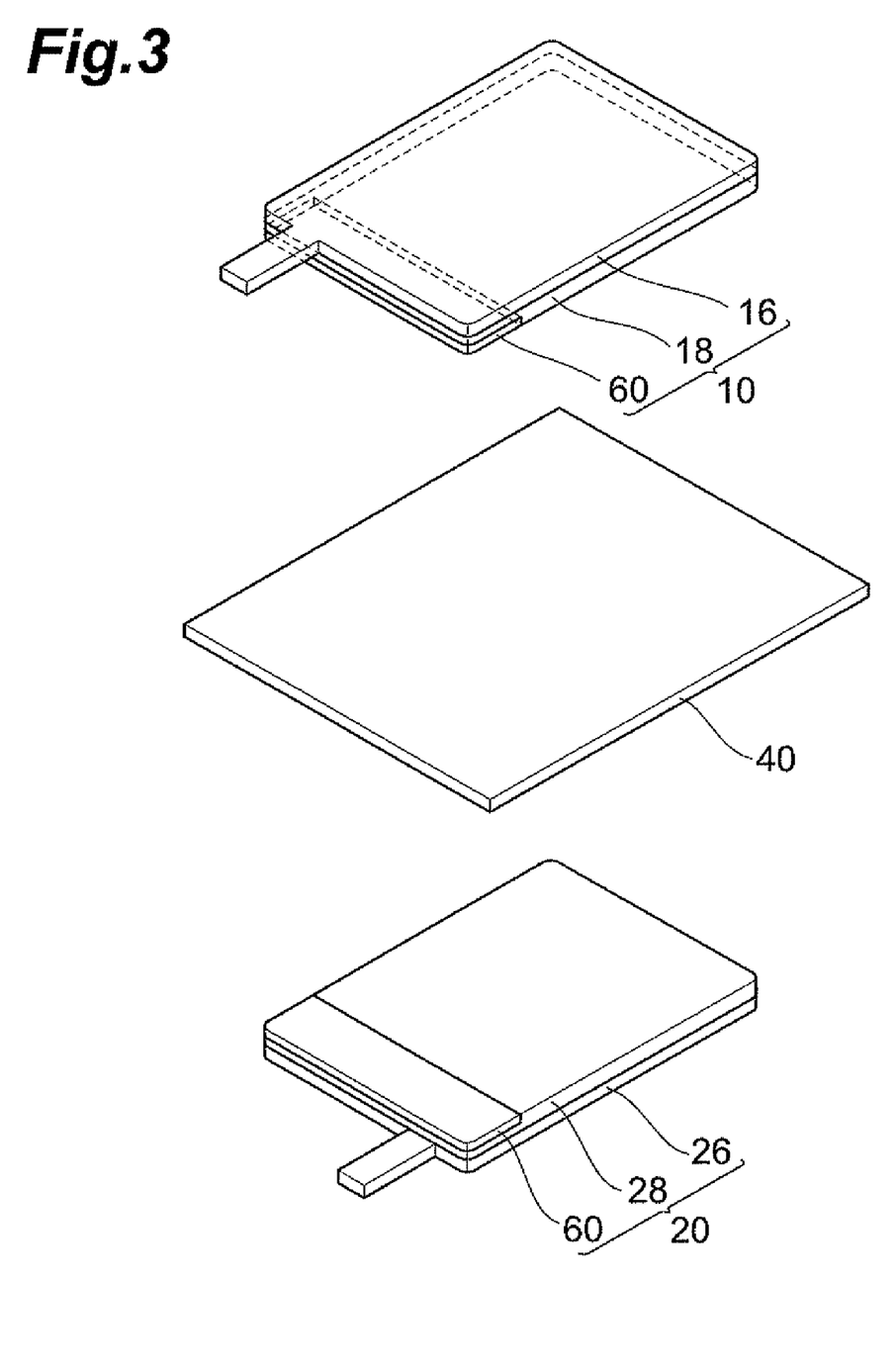
FIG. 3 is a partly exploded perspective view illustrating a multilayer structure composed of a negative electrode, a separator, and a positive electrode in the lithium-ion secondary battery as the electrochemical device in accordance with the present invention.
Figure 4:
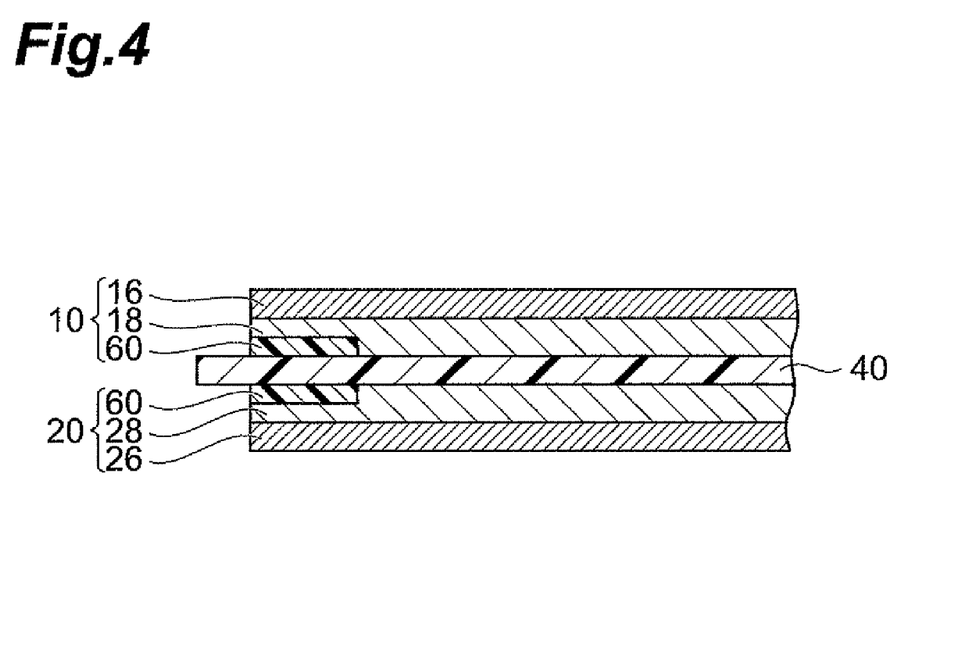
FIG. 4 is a partial schematic sectional view illustrating the multilayer structure composed of the negative electrode, separator, and positive electrode in the lithium-ion secondary battery as the electrochemical device in accordance with the present invention.

The positional relationship between the positive and negative electrodes and separators in the electrochemical device in accordance with the present invention will now be explained with reference to the drawings. FIG. 3 is a partly exploded perspective view illustrating a multilayer structure composed of a negative electrode, a separator, and a positive electrode in the lithium-ion secondary battery as the electrochemical device in accordance with the present invention, while FIG. 4 is a schematic sectional view thereof. In FIGS. 3 and 4, the negative electrode 10 is constituted by a negative electrode current collector 16, a negative electrode active material containing layer 18 formed on one surface of the negative electrode current collector 16, and a resistance control layer 60 formed at an edge part on the negative electrode active material containing layer 18. The positive electrode 20 is constituted by a positive electrode current collector 26, a positive electrode active material containing layer 28 formed on one face of the positive electrode current collector 26, and a resistance control layer 60 formed at an edge part on the positive electrode active material containing layer 28. The negative and positive electrodes 10, 20 are laminated with the separator 40 interposed therebetween such that their respective resistance control layers 60 oppose each other.

Figure 5:
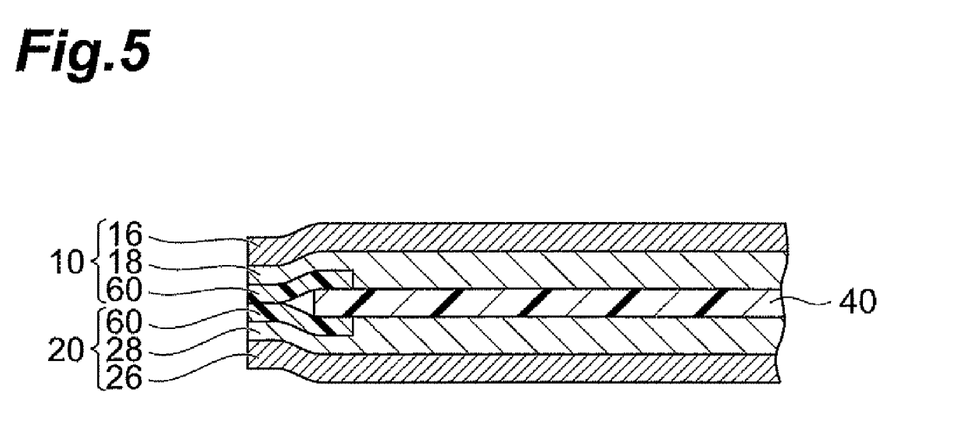
FIG. 5 is a partial schematic sectional view illustrating the multilayer structure composed of the negative electrode, separator, and positive electrode in the lithium-ion secondary battery as the electrochemical device in accordance with the present invention when short-circuited.
Figure 6:
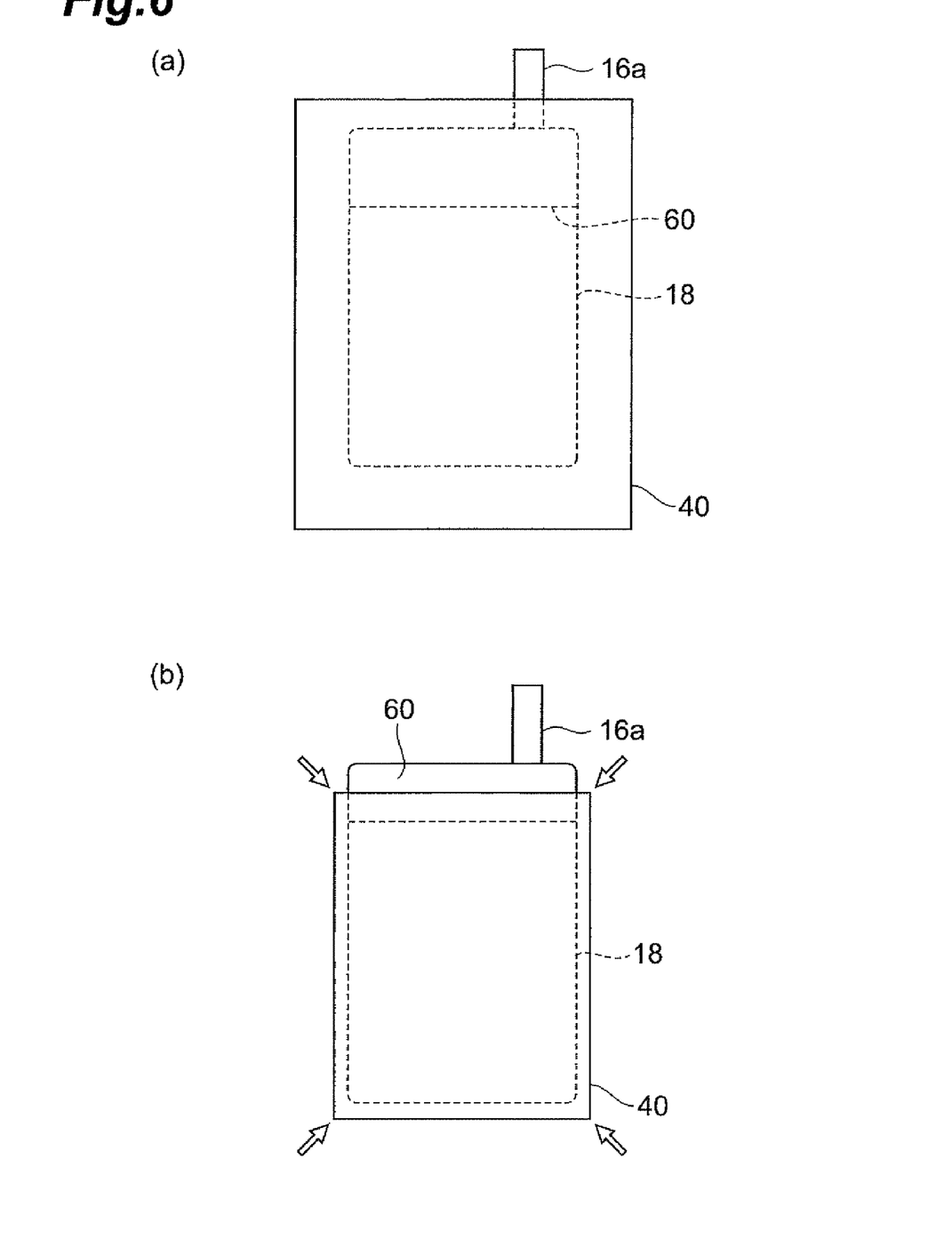
FIG. 6 is a plan view illustrating a positional relationship between an electrode and the separator in the lithium-ion secondary battery as the electrochemical device in accordance with the present invention.

FIG. 5 is a partial schematic sectional view illustrating the multilayer structure composed of the negative electrode, separator, and positive electrode when the lithium-ion secondary battery illustrated in FIG. 4 is short-circuited in an abnormally high temperature atmosphere. FIG. 6(a) is a plan view illustrating the positional relationship between the electrode (negative electrode) and separator in the lithium-ion secondary battery represented in FIG. 4, while FIG. 6(b) is a plan view illustrating the positional relationship between the electrode (negative electrode) and separator when the lithium-ion secondary battery of FIG. 6(a) is short-circuited in an abnormally high temperature atmosphere. As illustrated in FIGS. 5 and 6, when the lithium-ion secondary battery is placed in an abnormally high temperature atmosphere, the separator 40 shrinks, so that the edge parts of the negative and positive electrodes 10, 20 are exposed and come into direct contact with each other. Since the resistance control layers 60 are formed at the edge parts of the negative and positive electrodes 10, 20 exposed by the shrinkage of the separator 40 in the present invention, the negative and positive electrodes 10, 20 come into contact with each other through the resistance control layers 60. This can make the negative and positive electrodes 10, 20 moderately short-circuit each other, thereby drastically improving the safety.

In the lithium-ion secondary battery 100 illustrated in FIGS. 1 and 2, the electrolytic solution is contained within pores of the negative and positive electrode active material containing layers 18, 28 and separator 40. As for the electrolytic solution, electrolytic solutions (aqueous electrolytic solutions and electrolytic liquids using organic solvents) containing lithium salts employed in known lithium-ion secondary batteries can be used without any limitations in particular. However, electrolytic solutions using organic solvents (nonaqueous electrolytic solutions) are preferred, since the endurable voltage of aqueous electrolytic solutions is limited to a low level because of their electrochemically low decomposition voltage. As the electrolytic solution for the secondary battery, one in which a lithium salt is dissolved in a nonaqueous solvent (organic solvent) is preferably used. As the lithium salt, salts such as $LiPF_6$, $LiClO_4$, $LiBF_4$, $LiAsF_6$, $LiCF_3SO_3$, $LiCF_3$, $LiCF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and the like can be used, for example. These salts may be used singly or in combinations of two or more.

As the organic solvent, solvents employed in known secondary batteries can be used. Preferred examples include propylene carbonate, ethylene carbonate, and diethyl carbonate. They may be used singly or in mixtures of two or more at any ratios.

In this embodiment, the electrolytic solution may not only be a liquid but also a gelled electrolyte obtained by adding a gelling agent thereto. Instead of the electrolytic solution, a solid electrolyte (a solid polymer electrolyte or an electrolyte made of an ionically conductive inorganic material) may be contained.

As illustrated in FIG. 1, the leads 12, 22 project out of the case 50 through a seal part 50b while having ribbon-like outer forms.

The lead 22 is formed from a conductor material such as a metal. As this conductor material, aluminum or the like can be employed, for example. As illustrated in FIG. 1, the end part of the lead 22 within the case 50 is joined to respective tongues 26a, 26a of the positive electrode current collectors 26, 26 by resistance welding or the like, whereby the lead 22 is electrically connected to the positive electrode active material containing layers 28 through the respective positive electrode current collectors 26.

The lead 12 is also formed from a conductor material such as a metal. As this conductor material, a conductive material such as copper or nickel, for example, can be utilized. The end part of the lead 12 within the case 50 is welded to respective tongues 16a, 16a, 16a of the negative electrode current collectors 16, 16, 16, whereby the lead 12 is electrically connected to the negative electrode active material containing layers 18 through the respective negative electrode current collectors 16.

As illustrated in FIG. 1, the parts of the leads 22, 12 held at the seal part 50b of the case 50 are covered with insulators 24, 14 made of a resin or the like in order to enhance sealability. The insulators 24, 14 are not limited in particular in terms of materials, but preferably formed from a synthetic resin, for example. The leads 22, 12 are separated from each other in a direction orthogonal to the laminating direction of the electrode matrix 85.

The case 50 is not limited in particular as long as it can seal the electrode matrix 85 and prevent air and moisture from entering the inside of the case; cases employed for known secondary battery elements can be used. For example, synthetic resins such as epoxy resins and resin-laminated sheets of metals such as aluminum can be used. As illustrated in FIG. 1, the case 50, which is formed by folding a flexible rectangular sheet 51C into two at substantially the longitudinal center part thereof holds the electrode matrix 85 from both sides in the laminating direction (vertical direction). Among end parts of the two-folded sheet 51C, the seal parts 50b at three sides excluding the bent part 50a are bonded by heat-sealing or with an adhesive, whereby the electrode matrix 85 is sealed therewithin. The case 50 is also bonded to the insulators 24, 14 at the seal part 50b, so as to seal the leads 22, 12.

An example of methods of manufacturing the above-mentioned lithium-ion secondary battery 100 will now be explained.

First, the above-mentioned separator 40, negative electrode current collector 16, and positive electrode current collector 26 are prepared. Subsequently, respective coating liquids (slurries) containing constituent materials for forming electrode layers to become the negative and positive electrode active material containing layers 18, 28 are made. The negative electrode coating liquid is a solvent containing the above-mentioned negative electrode active material, conductive auxiliary agent, binder, and the like, while the positive electrode coating liquid is a solvent containing the above-mentioned positive electrode active material, conductive auxiliary agent, binder, and the like. The solvent used in the coating liquids is not limited in particular as long as it can dissolve the binders and disperse the active materials and conductive auxiliary agents. For example, N-methyl-2-pyrrolidone, N,N-dimethylformamide, and the like can be used.

Next, the negative electrode coating liquid is applied to both faces of the negative electrode current collector 16 and dried, so as to form the negative electrode active material containing layers 18 on the both faces. Subsequently, a resistance control layer 60 is formed at an edge part on the surface of each negative electrode active material containing layer 18. Thereafter, a multilayer body composed of the negative electrode current collector 16, negative electrode active material containing layers 18, and resistance control layer 60 is cut into rectangular forms each having a tongue 16a, so as to yield three negative electrodes 10.

Similarly, the positive electrode coating liquid is applied to both faces of the positive electrode current collector 26 and dried, so as to form the positive electrode active material containing layers 28 on the both faces. Subsequently, a resistance control layer 60 is formed at an edge part on the surface of each positive electrode active material containing layer 28. Thereafter, a multilayer body composed of the positive electrode current collector 26, positive electrode active material containing layers 28, and resistance control layer 60 is cut into rectangular forms each having a tongue 26a, so as to yield two positive electrodes 20.

Here, techniques for applying the coating liquids to the current collectors are not limited in particular, and may be determined appropriately according to the material, form, and the like of metal plates for the current collectors. Examples include metal mask printing, electrostatic coating, dip coating, spray coating, roll coating, doctor blading, gravure coating, and screen printing. After being applied, the coatings are extended by a flat press, calender rolls, or the like if necessary.

When the resistance control layer 60 is a layer containing a conductive material, a high-resistance material, and a binder, a coating liquid (slurry) containing the constituent materials mentioned above for forming the resistance control layer 60 is made, applied to the edge part on the surface of each active material containing layer, and dried, so as to form the resistance control layer 60. The solvent used in the coating liquid is not limited in particular as long as it can dissolve the binder and disperse the active material and conductive auxiliary agent. For example, N-methyl-2-pyrrolidone, N,N-dimethylformamide, and the like can be used. When forming the negative electrode active material containing layer 18 or positive electrode active material containing layer 28, the resistance control layer 60 may be applied simultaneously therewith in a multilayered manner. In this case, the same solvent as that for the active material containing layers can be used.

Techniques for applying the coating liquid to the active material containing layers are not limited in particular, and may be determined appropriately according to the materials, forms, and the like of the active material containing layers. Examples include metal mask printing, electrostatic coating, dip coating, spray coating, roll coating, doctor blading, gravure coating, and screen printing. Here, when forming the negative electrode active material containing layer or positive electrode active material containing layer, the resistance control layer may be applied simultaneously therewith in a multilayered manner, so as to form a multilayer body composed of the resistance control layer and active material containing layer. After being applied, the coatings are extended by a flat press, calender rolls, or the like if necessary. Such an extending process may yield a state where the resistance control layers 60 are embedded in the active material containing layers as illustrated in FIGS. 2 to 5.

When the resistance control layer 60 is a layer made of a high-resistance metal material, it can be formed by using a film-forming method such as vapor deposition, sputtering, or chemical vapor deposition (CVD).

When the resistance control layer 60 is a layer made of a ceramic material, it can be formed by using a film-forming method such as vapor deposition, sputtering, or chemical vapor deposition (CVD).

Subsequently, the negative and positive electrodes 10, 20 are laminated with the separators 40 interposed therebetween in the order of FIG. 2, i.e., negative electrode 10/separator 40/positive electrode 20/separator 40/negative electrode 10/separator 40/positive electrode 20/separator 40/negative electrode 10, and heated while being held at the center parts within the planes on both sides in the laminating direction, so as to yield the electrode matrix 85 illustrated in FIG. 2.

Then, the leads 12, 22 illustrated in FIG. 1 are prepared, and their longitudinal center parts are respectively coated with insulators 14, 24 made of a resin or the like. Subsequently, as illustrated in FIG. 1, the tongues 16a are welded to an end part of the lead 12, while the tongues 26a are welded to an end part of the lead 22. This completes the electrode matrix 85 having the leads 12, 22 connected thereto.

Next, a bag-shaped case 50 formed from a sheet in which aluminum is laminated with a thermally adhesive resin layer is prepared, the electrode matrix 85 is inserted therein from its opening, and an electrolytic solution is injected into the case 50 within a vacuum container, so that the electrode matrix 85 is dipped in the electrolytic solution. Thereafter, each of the leads 22, 12 is partly projected out of the case 50, and the opening 50c of the case 50 is sealed with a heat sealer. This completes the making of the lithium-ion secondary battery 100.

The present invention can be modified in various ways without being restricted to the above-mentioned embodiment. For example, though the above-mentioned embodiment relates to a case where the resistance control layers 60 are formed at only one edge part of each electrode, the resistance control layers 60 may be formed at a plurality of edge parts or all the edge parts of each electrode. In a part of the electrodes in the electrode matrix 85, the resistance control layer 60 may be formed on the whole surface of the electrode. In this case, the electrode becomes a dummy electrode which does not substantially contribute to the electrochemical capacity, since its active material containing layer is covered with the resistance control layer 60. Such a dummy electrode may be constituted by the current collector and resistance control layer 60 alone without the active material containing layer.

Though the above-mentioned embodiment relates to a case where the resistance control layers 60 are formed on both of the positive and negative electrodes 20, 10, the resistance control layer 60 may be formed on one of the positive and negative electrodes 20, 10 alone. Though the lithium-ion secondary battery illustrated in FIGS. 1 and 2 relates to a case where all the multilayer structures each laminating the positive and negative electrodes 20, 10 with the separator 40 interposed therebetween have the resistance control layers 60, the lithium-ion secondary battery may include a multilayer structure having no resistance control layer 60. In other words, it will be sufficient if the electrochemical device in accordance with the present invention includes at least one multilayer structure having the resistance control layer 60 in the electrode matrix 85.

Though the electrode matrix 85 in the lithium-ion secondary battery illustrated in FIGS. 1 and 2 has four secondary battery elements as single cells, i.e., combinations of negative electrode/separator/positive electrode, the number of secondary battery elements may be more than 4 or less than 3, e.g., 1.

Though the lithium-ion secondary battery illustrated in FIGS. 1 and 2 exemplifies a mode in which each of the outermost two electrodes in the electrode matrix 85 is a three-tier negative electrode 10 in which the negative electrode active material containing layers 18 are formed on both faces of the negative electrode current collector 16 as a preferred mode, one or each of the outermost two electrodes may be realized as a two-tier negative electrode in which the negative electrode active material containing layer 18 is formed on one face of the negative electrode current collector 16.

Though the lithium-ion secondary battery illustrated in FIGS. 1 and 2 exemplifies a mode in which each of the outermost two electrodes in the electrode matrix 85 is the negative electrode 10 as a preferred mode, the present invention can be carried out with the two outermost electrodes being the positive electrode 20 and negative electrode 10, respectively, or both the positive electrodes 20, 20.

Though the above-mentioned embodiment relates to a case where the electrochemical device is a lithium-ion secondary battery, the electrochemical device in accordance with the present invention is not limited to the lithium-ion secondary battery, but may be any of secondary batteries other than the lithium-ion secondary batteries, such as metal lithium secondary batteries, and electrochemical capacitors such as electric double layer capacitors, pseudocapacity capacitors, pseudocapacitors, and redox capacitors. In the case of electrochemical devices other than the lithium-ion secondary batteries, electrode active materials suitable for the respective electrochemical devices may be used. In the case of an electric double layer capacitor, for example, acetylene black, graphite, activated carbon, and the like are used as the active materials contained in the positive and negative electrode active material containing layers.

EXAMPLES

In the following, the present invention will be explained more specifically with reference to examples and comparative examples, though the present invention is not limited to the following examples.

Example 1

Making of Negative Electrode

A negative electrode was made by the following procedure. First, 90 parts by mass of mesocarbon microbeads (MCMB) (manufactured by Osaka Gas Co., Ltd.) and 1 part by mass of graphite (product name: KS-6 manufactured by Lonza) as a negative electrode active material, 2 parts by mass of carbon black (product name: DAB manufactured by Denki Kagaku Kogyo, K.K.) as a conductive auxiliary agent, and 7 parts by mass of polyvinylidene fluoride (product name: Kynar 761 manufactured by Atofina) as a binder were mixed and dispersed, and then an appropriate amount of N-methylpyrrolidone (NMP) as a solvent was added thereto, so as to adjust viscosity, thereby making a slurry-like negative electrode coating liquid.

Subsequently, a copper foil (having a thickness of 20 μm) as a negative electrode current collector was prepared, the negative electrode coating liquid was applied to both faces of the copper foil and dried, so as to form negative electrode active material containing layers (each having a thickness of 75 μm).

Also, 5 parts by mass of carbon black (product name: DAB manufactured by Denki Kagaku Kogyo, K.K.), 40 parts by mass of polyvinylidene fluoride (product name: Kynar 761 manufactured by Atofina) as a binder, and 55 parts by mass of zirconia oxide particles (product name: Zirconia Oxide, manufactured by Kojundo Chemical Lab. Co., Ltd., having an average particle size of 1 μm) were mixed and dispersed, and then an appropriate amount of N-methylpyrrolidone (NMP) as a solvent was added thereto, so as to adjust viscosity, thereby making a slurry-like resistance control layer coating liquid.

Next, the resistance control layer coating liquid was applied to one edge part on the surface of each negative electrode active material containing layer and dried, so as to form a resistance control layer (having a thickness of 62 μm). Thus obtained negative electrode sheet was punched out into such a form that each active material containing layer surface had a size of 144 mm×102 mm while the current collector had a tongue to become an external output terminal, thus yielding a negative electrode. In this negative electrode, the resistance control layers were formed by a width of 3 mm at the edge part on the side formed with the tongue.

Making of Positive Electrode

A positive electrode was made by the following procedure. First, 91 parts by mass of lithium cobaltate ($LiCoO_2$) (product name: Selion manufactured by Seimi Chemical Co., Ltd.) and 4 parts by mass of graphite (product name: KS-6 manufactured by Lonza) as a positive electrode active material, 2 parts by mass of carbon black (product name: DAB manufactured by Denki Kagaku Kogyo, K.K.) as a conductive auxiliary agent, and 3 parts by mass of polyvinylidene fluoride (product name: Kynar 761 manufactured by Atofina) as a binder were mixed and dispersed, and then an appropriate amount of N-methylpyrrolidone (NMP) as a solvent was added thereto, so as to adjust viscosity, thereby making a slurry-like positive electrode coating liquid.

Subsequently, an aluminum foil (having a thickness of 15 μm) as a positive electrode current collector was prepared, the positive electrode coating liquid was applied to both faces of the aluminum foil and dried, so as to form positive electrode active material containing layers (each having a thickness of 95 μm).

Next, the same resistance control layer coating liquid as that for the negative electrode was applied to one edge part on the surface of each positive electrode active material containing layer and dried, so as to form a resistance control layer (having a thickness of 62 μm). Thus obtained positive electrode sheet was punched out into such a form that each active material containing layer surface had a size of 144 mm×102 mm while the current collector had a tongue to become an external output terminal, thus yielding a positive electrode. In this positive electrode, the resistance control layers were formed by a width of 3 mm at the edge part on the side formed with the tongue.

Making of Electrode Matrix

As separators, porous films made of drawn polyolefin (product name: SV722, manufactured by Asahi Kasei Corporation, having a size of 148 mm×106 mm with a thickness of 22 μm) were prepared. Then, four negative electrodes and three positive electrodes were alternately laminated with the separators, so as to yield an electrode matrix having the same multilayer structure as that illustrated in FIG. 2 except for the numbers of laminated electrodes and separators.

Making of Lithium-Ion Secondary Battery

The above-mentioned electrode matrix was put into an outer package made of an aluminum-laminated film. The outer package was sealed after injecting therein an electrolytic solution composed of a mixture of propylene carbonate (PC), ethylene carbonate (EC), and diethyl carbonate (DEC) at a volume ratio of 2:1:7 as a solvent and 1.5 mol/L of $LiPF_6$ as a solute, so as to yield a lithium-ion secondary battery having the same structure as that illustrated in FIG. 1 except for the numbers of laminated electrodes and separators.

Example 2

After mixing and dispersing 3 parts by mass of carbon black (product name: DAB manufactured by Denki Kagaku Kogyo, K.K.), 40 parts by mass of polyvinylidene fluoride (product name: Kynar 761 manufactured by Atofina) as a binder, and 57 parts by mass of zirconia oxide particles (product name: Zirconia Oxide, manufactured by Kojundo Chemical Lab. Co., Ltd., having an average particle size of 1 μm), an appropriate amount of N-methylpyrrolidone (INM) as a solvent was added thereto, so as to adjust viscosity, thereby making a slurry-like resistance control layer coating liquid. Except that the resistance control layers of the negative and positive electrodes were produced by using this resistance control layer coating liquid, a lithium-ion secondary battery was made as in Example 1.

Example 3

After mixing and dispersing 2 parts by mass of carbon black (product name: DAB manufactured by Denki Kagaku Kogyo, K.K.), 40 parts by mass of polyvinylidene fluoride (product name: Kynar 761 manufactured by Atofina) as a binder, and 58 parts by mass of zirconia oxide particles (product name: Zirconia Oxide, manufactured by Kojundo Chemical Lab. Co., Ltd., having an average particle size of 1 µm), an appropriate amount of N-methylpyrrolidone (AMP) as a solvent was added thereto, so as to adjust viscosity, thereby making a slurry-like resistance control layer coating liquid. Except that the resistance control layers of the negative and positive electrodes were produced by using this resistance control layer coating liquid, a lithium-ion secondary battery was made as in Example 1.

Example 4

After mixing and dispersing 1 part by mass of carbon black (product name: DAB manufactured by Denki Kagaku Kogyo, K.K.), 40 parts by mass of polyvinylidene fluoride (product name: Kynar 761 manufactured by Atofina) as a binder, and 59 parts by mass of zirconia oxide particles (product name: Zirconia Oxide, manufactured by Kojundo Chemical Lab. Co., Ltd., having an average particle size of 1 µm), an appropriate amount of N-methylpyrrolidone (NMP) as a solvent was added thereto, so as to adjust viscosity, thereby making a slurry-like resistance control layer coating liquid. Except that the resistance control layers of the negative and positive electrodes were produced by using this resistance control layer coating liquid, a lithium-ion secondary battery was made as in Example 1.

Comparative Example 1

A lithium-ion secondary battery was made as in Example 1 except that no resistance control layer was provided.

Comparative Example 2

After mixing and dispersing 10 parts by mass of carbon black (product name: DAB manufactured by Denki Kagaku Kogyo, K.K.), 40 parts by mass of polyvinylidene fluoride (product name: Kynar 761 manufactured by Atofina) as a binder, and 50 parts by mass of zirconia oxide particles (product name: Zirconia Oxide, manufactured by Kojundo Chemical Lab. Co., Ltd., having an average particle size of 1 µm), an appropriate amount of N-methylpyrrolidone (NMP) as a solvent was added thereto, so as to adjust viscosity, thereby making a slurry-like resistance control layer coating liquid. Except that the resistance control layers of the negative and positive electrodes were produced by using this resistance control layer coating liquid, a lithium-ion secondary battery was made as in Example 1.

Comparative Example 3

After mixing and dispersing 1 part by mass of carbon black (product name: DAB manufactured by Denki Kagaku Kogyo, K.K.), 40 parts by mass of polyvinylidene fluoride (product name: Kynar 761 manufactured by Atofina) as a binder, and 59 parts by mass of zirconia oxide particles (product name: Zirconia Oxide, manufactured by Kojundo Chemical Lab. Co., Ltd., having an average particle size of 1 µm), an appropriate amount of N-methylpyrrolidone (MPA) as a solvent was added thereto, so as to adjust viscosity, thereby making a slurry-like resistance control layer coating liquid. Except that the resistance control layers of the negative and positive electrodes were produced by using this resistance control layer coating liquid with a thickness of 100 µm each, a lithium-ion secondary battery was made as in Example 1.

Measurement of Discharged Capacity

The discharged capacity of each of the lithium-ion secondary batteries of Examples 1 to 4 and Comparative Examples 1 to 3 was measured by performing constant current constant voltage charging to 4.2 V with a current equivalent to 0.5 C and then discharging to 3.3 V with a current equivalent to 0.5 C. Table 1 shows the results.

Measurement of Resistance Value of Resistance Control Layer

The resistance value in the thickness direction of resistance control layers in the lithium-ion secondary batteries of Examples 1 to 4 and Comparative Examples 2 and 3 was measured by the following method. That is, an electrode in which an active material containing layer and a resistance control layer were formed on only one face of a current collector was prepared and, while both sides (resistance control layer side and current collector side) of the electrode were held with probe electrodes having a diameter of 0.3 mm, the voltage upon application of a constant current of 50 mA was measured with a potentio/galvanostat (product name: RA-151 manufactured by Hokluto Denko Corporation), so as to calculate the resistance value of the resistance control layer. The resistance value was measured for each of the positive and negative electrodes, so as to calculate the total resistance value of resistance control layers in the whole cell. Table 1 shows the results.

Measurement of Battery Voltage

The fully charged battery voltage of each of the lithium-ion secondary batteries of Examples 1 to 4 and Comparative Examples 1 to 3 was verified to be their designed value of 4.2 V. Specifically, the voltage of each of the fully charged lithium-ion secondary batteries was measured by a voltmeter (product name: BATTERY HiTESTER 3555 manufactured by Hioki E. E. Corporation). As a result, it was verified that all the lithium-ion secondary batteries had the filly charged battery voltage of 4.2 V as designed.

Calculation of Estimated Internal Short Circuit Current An estimated internal short circuit current of each of the lithium-ion secondary batteries of Examples 1 to 4 and Comparative Examples 1 to 3 was calculated according to the following equation (1). Here, the discharged capacity, the resistance value of the resistance control layer, and the fully charged battery voltage were measured by the respective methods mentioned above. Table 1 shows the results.

[Math. 1]

$$\text{Estimated internal short circuit current } (C) = \frac{\text{fully charged battery voltage (V)}}{\text{discharged capacity (Ah)} \times \text{resistance value of resistance control layer } (\Omega)} \quad (1)$$

Safety Evaluation

The lithium-ion secondary batteries of Examples 1 to 4 and Comparative Examples 1 to 3 were subjected to a 155° C. heating test in the fully charged state, so as to evaluate their safety. Specifically, each lithium-ion secondary battery was subjected to constant current constant voltage charging to 4.2 V with a current equivalent to 0.5 C. While being kept in a high-temperature vessel, the charged lithium-ion secondary battery was heated to 155° C. at a heating rate of 5° C./min and then held at 155° C. for 1 hr. Here, the temperature change (reached temperature) of the lithium-ion secondary battery during the heating and holding was measured, so as to evaluate the stability of the lithium-ion secondary battery. For example, batteries with lower thermostability tend to exhibit steeper temperature rises than the heating profile of the high-temperature vessel in the process of heating (in the vicinity of 120° C.). Such a phenomenon is presumed to be caused by gas generation within the lithium-ion secondary batteries. By contrast, lithium-ion secondary batteries having higher thermostability generate less heat from therewithin, so as to exhibit a thermal behavior similar to the heating profile of the high-temperature vessel. Table 1 shows the results. The lower the reached temperature is, the higher the safety becomes. In this test, the lithium-ion secondary batteries exhibiting inflation and smoke, thus causing problems in their safety, were indicated with "inflation, smoke".

Example 8

In the negative and positive electrodes, the resistance control layers were made by the following procedure. That is, the resistance control layer (having a thickness of 4.3 μm per electrode sheet) made of amorphous silicon (having a specific resistance of $3.4 \times 10^{-3}$ mΩ·cm) was formed by CVD using an $SiH_4+H_2$ gas at one edge part on the surface of each active material containing layer. Except for this point, a lithium-ion secondary battery was made as in Example 1.

Example 9

A lithium-ion secondary battery was made as in Example 8 except that the thickness of the resistance control layer made of amorphous silicon per electrode sheet was 7.7 μm in the negative and positive electrodes.

Example 10

A lithium-ion secondary battery was made as in Example 8 except that the thickness of the resistance control layer made of amorphous silicon per electrode sheet was 12.7 μm in the negative and positive electrodes.

TABLE 1

| | Discharged capacity (Ah) | Battery voltage (V) | Estimated internal short circuit current (C) | Resistance control layer | | | | | Reached temperature (° C.) |
| --- | --- | --- | --- | --- | --- | --- | --- | --- | --- |
| | | | | Carbon black content (mass %) | Binder content (mass %) | Ceramic particle content (mass %) | Thickness per electrode sheet (μm) | Total resistance value (Ω) | |
| Example 1 | 2.0 | 4.20 | 0.88 | 5 | 40 | 55 | 62 | 2.4 | 156 |
| Example 2 | 2.1 | 4.20 | 0.40 | 3 | 40 | 57 | 62 | 5.0 | 155 |
| Example 3 | 2.0 | 4.20 | 0.23 | 2 | 40 | 58 | 62 | 9.0 | 157 |
| Example 4 | 2.0 | 4.20 | 0.14 | 1 | 40 | 59 | 62 | 15.0 | 159 |
| Comparative Example 1 | 2.1 | 4.20 | — | — | — | — | — | — | inflation, smoke |
| Comparative Example 2 | 2.0 | 4.20 | 2.10 | 10 | 40 | 50 | 62 | 1.0 | inflation, smoke |
| Comparative Example 3 | 2.0 | 4.20 | 0.08 | 1 | 40 | 59 | 100 | 25.0 | inflation, smoke |

Example 5

In the negative and positive electrodes, the resistance control layers were made by the following procedure. That is, the resistance control layer (having a thickness of 2.6 μm per electrode sheet) made of tungsten (having a specific resistance of $5.65 \times 10^{-3}$ mΩ·cm) was formed by sputtering at one edge part on the surface of each active material containing layer. Except for this point, a lithium-ion secondary battery was made as in Example 1.

Example 6

A lithium-ion secondary battery was made as in Example 5 except that the thickness of the resistance control layer made of tungsten per electrode sheet was 4.8 μm in the negative and positive electrodes.

Example 7

A lithium-ion secondary battery was made as in Example 5 except that the thickness of the resistance control layer made of tungsten per electrode sheet was 8.0 μm in the negative and positive electrodes.

Comparative Example 4

A lithium-ion secondary battery was made as in Example 5 except that the thickness of the resistance control layer made of tungsten per electrode sheet was 0.5 μm in the negative and positive electrodes.

Comparative Example 5

A lithium-ion secondary battery was made as in Example 8 except that the thickness of the resistance control layer made of amorphous silicon per electrode sheet was 0.8 μm in the negative and positive electrodes.

Evaluations of Battery Characteristics

For the lithium-ion secondary batteries of Examples 5 to 10 and Comparative Examples 4 and 5, evaluations of battery characteristics, i.e., measurement of discharged capacity, the resistance value of the resistance control layer, and battery voltage, calculation of the estimated internal short circuit current, and safety evaluation, were carried out by the same methods as those mentioned above. Table 2 shows the results.

TABLE 2

| | Discharged capacity (Ah) | Battery voltage (V) | Estimated internal short circuit current (C) | Resistance control layer | | | Reached temperature (° C.) |
| --- | --- | --- | --- | --- | --- | --- | --- |
| | | | | Material | Thickness per electrode sheet (μm) | Total resistance value (Ω) | |
| Example 5 | 2.0 | 4.20 | 0.42 | tungsten | 2.6 | 5.0 | 156 |
| Example 6 | 2.0 | 4.20 | 0.23 | tungsten | 4.8 | 9.2 | 155 |
| Example 7 | 2.1 | 4.20 | 0.14 | tungsten | 8.0 | 14.8 | 158 |
| Comparative Example 4 | 2.0 | 4.20 | 1.91 | tungsten | 0.5 | 1.1 | inflation, smoke |
| Example 8 | 2.0 | 4.20 | 0.40 | amorphous silicon | 4.3 | 5.3 | 157 |
| Example 9 | 2.1 | 4.20 | 0.23 | amorphous silicon | 7.7 | 8.7 | 155 |
| Example 10 | 2.0 | 4.20 | 0.14 | amorphous silicon | 12.7 | 15.2 | 158 |
| Comparative Example 5 | 2.0 | 4.20 | 2.10 | amorphous silicon | 0.8 | 1.0 | inflation, smoke |

What is claimed is:

1. An electrochemical device having an electrode matrix including a multilayer structure laminating positive and negative electrodes with a separator interposed therebetween;

wherein at least one of the positive and negative electrodes has a resistance control layer at least at an edge part exposed when the separator thermally shrinks on a surface on the separator side; and wherein the resistance control layer has a resistance value as a total resistance value of the electrode matrix falling in such a range that an estimated internal short circuit current between the positive and negative electrodes is equivalent to 0.09 C to 1 C.

2. An electrochemical device according to claim 1, wherein each of the positive and negative electrodes has the resistance control layer.

3. An electrochemical device according to claim 1, wherein one of the positive and negative electrodes has the resistance control layer.

4. An electrochemical device according to claim 1, wherein the resistance control layer is a layer containing carbon black, a binder, and a ceramic particle.

5. An electrochemical device according to claim 4, wherein the ratio of the content of the carbon black to a combined amount of the binder and ceramic particle in the resistance control layer is 1:99 to 10:90 in terms of mass ratio.

6. An electrochemical device according to claim 1, wherein the resistance control layer is a layer made of tungsten, tantalum, nickel-chromium alloys, or a ceramic material.

7. An electrochemical device according to claim 1, wherein the separator is constituted by a polyolefin, a polyamide imide having a surface coated with a polyacrylonitrile, a drawn polyolefin, a nonwoven-type polyolefin, a nonwoven-type polyacrylonitrile, a nonwoven-type polyamide imide, or a mixture or combination thereof.

8. An electrochemical device according to claim 1, wherein at least one of the positive and negative electrodes is accommodated within the separator shaped like a bag having an opening.

* * * * *